(12) United States Patent
Anand et al.

(10) Patent No.: US 7,143,263 B2
(45) Date of Patent: Nov. 28, 2006

(54) SYSTEM AND METHOD OF ADAPTIVELY RECONFIGURING BUFFERS

(75) Inventors: Vaijayanthimala K. Anand, Austin, TX (US); William Henry Hartner, Austin, TX (US); Sandra K. Johnson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 10/687,259

(22) Filed: Oct. 16, 2003

(65) Prior Publication Data

US 2005/0086448 A1    Apr. 21, 2005

(51) Int. Cl.
G06F 12/00    (2006.01)
(52) U.S. Cl. .................. 711/171; 711/170; 710/52; 710/56; 713/1
(58) Field of Classification Search ............... None
See application file for complete search history.

(56) References Cited

U.S. PATENT DOCUMENTS

| | | | |
|---|---|---|---|
| 5,640,604 A * | 6/1997 | Hirano .................. | 710/56 |
| 6,070,202 A * | 5/2000 | Minkoff et al. ........... | 710/56 |
| 2004/0267982 A1 * | 12/2004 | Jackson et al. ........... | 710/52 |

OTHER PUBLICATIONS

*Adaptive Buffer Threshold Updating for an ATM Switch*, by E. Yaprak, K. Psarris and Yi Xiao, 1998 IEEE.

*An Adaptive Buffer Management Algorithm for Enhancing Dependability and Performance in Mobile-Object-Based Real-time Computing*, by May T. W. Ip, Wilfred W. K. Lin, Allen K. Y. Wong, Tharan S. Dillon and Dianhui Wang, 2001 IEEE.

*Heuristic Rule Based Neuro-Fuzzy Approach for Adaptive Buffer Management for Internet-Based Computing*, by Dianhui Wang, Allan K. Y. Wong and Tharan S. Dillon, 2002 IEEE.

*A Load Adapative Mechanism for Buffer Management*, by Aweya, James Ouellette, Michel Montuno, and Delfin Y., Computer Networks, The International Journal of Computer and Teleco, Nications Networking, v.36, n5-6, Aug. 2001, p709(1).

* cited by examiner

*Primary Examiner*—Reginald Bragdon
*Assistant Examiner*—Jasmine Song
(74) *Attorney, Agent, or Firm*—Volel Emile; Leslie Van Leeuwen; D'Ann Rifai

(57) ABSTRACT

A system and method of adaptively reconfiguring a pool of buffers are provided. The buffers are initially configured to a size (i.e., a current size). Each time data is placed in the buffers by an application program, it is determined whether the size of the data is greater than the current size of the buffers. If the size of the data is greater than the current size of the buffers, the buffers are reconfigured to the size of the data if the number of times data of that size is stored in the buffers is greater than a first threshold. If, however, the size of the data is smaller than the current size of the buffers, the buffers may be reconfigured to the size of the data if the number of times data of that size is stored in the buffers is smaller than a second threshold.

27 Claims, 7 Drawing Sheets

SYSTEM AND METHOD OF ADAPTIVELY RECONFIGURING BUFFERS

BACKGROUND OF THE INVENTION

1. Technical Field

The present invention is directed to memory systems. More specifically, the present invention is directed to a system and method of adaptively reconfiguring buffers.

2. Description of Related Art

Due to continued advances in very large scale integration (VLSI) technology, processor performance has steadily been increasing from one generation to the next. Input/output (I/O) performance of secondary storage devices (e.g., disk drives, optical disk drives etc.) however, has not kept pace. Particularly, I/O performance of disks is constrained by the amount of time needed to locate and retrieve data, otherwise known as seek and rotational times. On the average, seek and rotational times for random accesses to disks are orders of magnitude longer than the time required to transfer data between a processor and main memory. Thus, a throughput imbalance exists between processors and disks. To reduce this imbalance, buffers are used.

Generally, most computer systems allocate memory space for a number of buffers configurable according to memory size and system performance constraints during system initialization. Under most operational conditions, the buffers are able to accommodate the data being placed therein. In some instances, however, the buffers may not be able to handle the size of the data. Particularly, when the size of the data exceeds the size of the buffer into which it is being placed, a buffer overflow may ensue. When that occurs, the excess data may overflow into an adjacent buffer. If data was stored in the adjacent buffer, the data may become corrupted.

Some systems allow sophisticated users to manually reconfigure buffers. Most users, however, are not sophisticated enough to be able to do so. In addition, even sophisticated users may not do so if they do not know or cannot anticipate the size of the data that is to be placed in the buffers.

Thus, what is needed is a system and method of adaptively reconfiguring buffers.

SUMMARY OF THE INVENTION

The present invention provides a system and method of adaptively reconfiguring a pool of buffers. The buffers are initially configured to a size (i.e., a current size). Each time data is placed in the buffers by an application program, it is determined whether the size of the data is greater than the current size of the buffers. If the size of the data is greater than the current size of the buffers, the buffers are reconfigured to the size of the data if the number of times data of that size is stored in the buffers is greater than a first threshold. If, however, the size of the data is smaller than the current size of the buffers, the buffers may be reconfigured to the size of the data if the number of times data of that size is stored in the buffers is smaller than a second threshold. If due to system constraints the buffers cannot or should not be reconfigured, a hint may be sent to the program to use data of a larger or smaller size. The first and second thresholds may be reconfigured due to those system constraints.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The invention allows buffers that are allocated for application programs to be adaptively changed in size based on the programs' need or usage. To ensure that all application program and subsystem needs are met effectively and to avoid overuse of available buffers, a maximum size and a minimum size threshold are set for each application program that is registered for the adaptive buffer management subsystem. The maximum size and minimum size thresholds are utilized to adjust the size of the available buffers or to adjust the size of the data being used.

The buffers may be increased to a size that is a multiple of their current size, as long as the increased size is able to accommodate the data being stored therein. Alternatively, the size of the data being used may be reduced to fit into the buffers by passing suggestions/hints to the application programs about buffer availability. These suggestions may fall under different categories such as critical and non-critical. These can be negotiated between the application programs and the system at the start of the execution of the application programs, and can be renegotiated as often as possible.

The system may keep a heuristic of buffer usage by each application program (i.e., sporadic use of a high/low number of buffers, or constant use of high/low number of buffers). By doing so, the system may implement a more efficient buffer management. For example, if the system realizes that a high flow of requests for a high number of buffers is temporary, the system may try to accommodate these requests and as soon as the request flow slows down, the system may pull back these buffers to be used for other purposes in the system or for other application programs. The system may also communicate the heuristics or the intelligence gained from these heuristics to the application programs, to make sure that the programs support this type of buffer management. In doing so, the system may take into consideration cache affinity (i.e., whether a particular data has already been cached) and warn against cache effects when buffers are pulled away from one application to be used elsewhere.

The present invention will be described using buffers allocated in a system memory of a computer system. However, it should be noted that the invention is not thus restricted. That is, the buffers may be included in storage devices, networking devices, adapters, system heaps, caches, etc. Consequently, the use of buffers allocated in system memories is only for illustrative purposes only.

Figure 1:
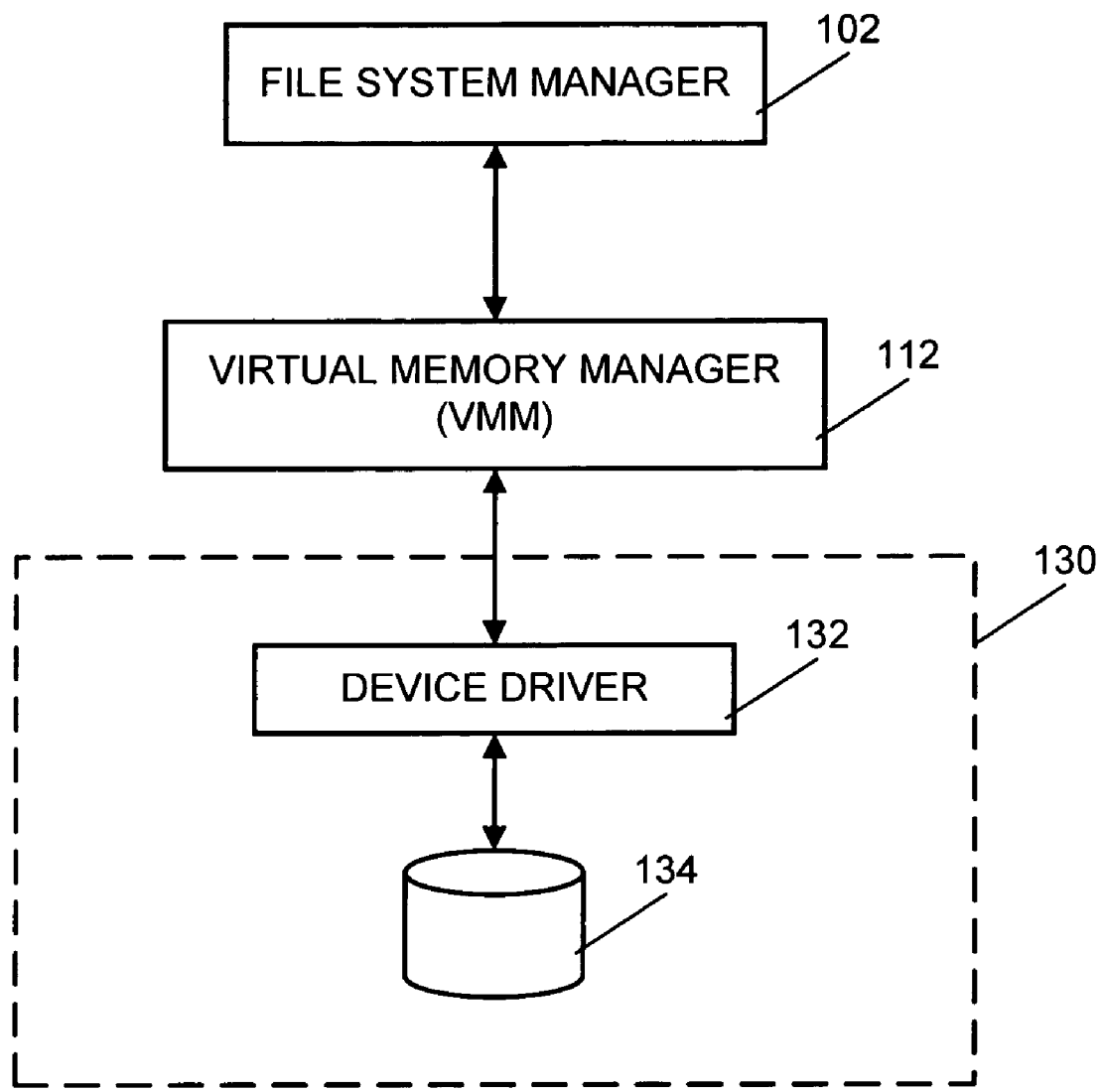
FIG. 1 depicts a conceptual view of a storage subsystem of a computer system.

With reference now to the figures, FIG. 1 depicts a conceptual view of a storage subsystem of a computer system. The storage subsystem includes a file system manager 102, a VMM 112 and a block device layer 130. The block device layer includes a device driver 132 and a storage device 134. The storage device 134 may be a disk, cartridge, tape or any other type of non-volatile memory including network storage. It should be noted that the devices shown in FIG. 1 are not all inclusive. There may be more devices used by the storage subsystem. Consequently, FIG. 1 should be taken only as an example of a storage subsystem.

The file system manager 102 interacts with executing programs. For example, when an executing program desires to read data, it notifies the file system manager 102 of its desire. The file system manager 102 then checks with the VMM 112 to see whether the data is already in memory (not shown). If the data is in memory, it will be supplied to the program. If it is not in memory, it will be fetched from the disk and provided to the requesting program.

Accessing the disk to read or write data is a relatively slow process. Thus, to minimize the frequency of disk accesses, a pool of internal data buffers (not shown) called a buffer cache is kept in memory. When data is read from the disk, it is cached for future use. Similarly, data written onto the disk is also cached for future use.

As mentioned before, due to memory size and system performance constraints, the pool of buffers may be configured to a certain size. Suppose, as an example, they are configured to be of 4 kbytes each. If a piece of data is greater than 4 kbytes, more than one buffer may have to be used to cache the data. In certain instances, some memory space may be wasted while in other instances buffer overflow may occur. The present invention is used to reduce the amount of memory space that may be wasted or the number of buffer overflows that may occur when data being used is continually larger than the size of a cache buffer.

As mentioned above, minimum and maximum size thresholds are utilized to adjust the size of the available buffers or to provide hints to the application programs to adjust the size of the data being used. The maximum and minimum size thresholds are also used to ensure against constant re-adjustments of the size of the buffers and/or data. For example, when data of a size larger than an available buffer is continually being used, the size of the buffers may be increased if the number of times data larger than the available buffers is used is greater than the maximum size threshold. Conversely, the size of the buffers may be decreased if the number of times data smaller than the available buffers is used is greater than the minimum size threshold.

Based on load constraints, the buffers may not be reconfigured. In such cases, the operating system may send a signal (i.e., a hint) to the application program to either increase or decrease the size of the data being used. Alternatively, the operating system may provide a hint to the application program to increase or decrease the number of data requests being made within a certain period of time.

The buffers may be increased to a size that is a multiple of their current size or decreased to a fraction of their current size so long as they can accommodate the data being placed therein. Note that the size of the buffers may be changed stepwise. That is, if 4 kbytes pieces of data have been used and the size of the available buffers is 16 kbytes, then upon receiving a first signal, the size of the available buffers may be decreased to 8 kbytes. If another signal is received, the size of the buffers may again be decreased to 4 kbytes etc. Likewise, the size of the buffers may be increased to 8 kbytes when a first signal is received and to 16 kbytes when a second signal is received etc.

Figure 2A:
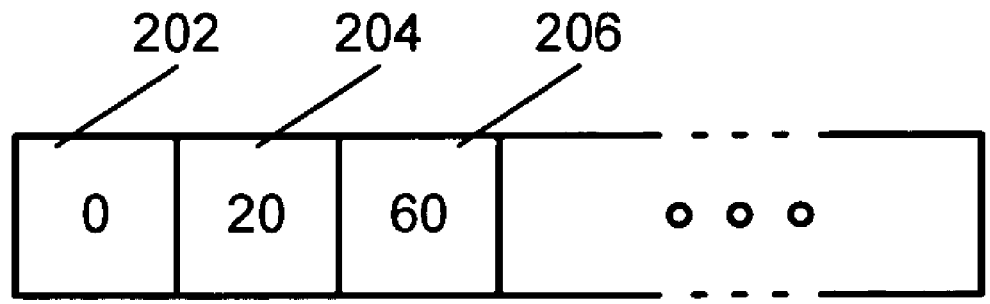
FIG. 2 depicts an exemplary one-dimensional array of counters.

To keep track of the number of times different sizes of data are used, an array of counters is used. FIG. 2a depicts an exemplary one-dimensional array of counters. Each location in the array is associated with a data size. For example, array location 202 may be associated with 4 kbytes data size. Array location 204 may be associated with 8 kbytes data size whereas location 206 may be associated with 16 kbytes data size etc. Each time a piece of data is used, the array is updated. That is, depending on whether the data is 4 kbytes, 8 kbytes or 16 kbytes in size, locations 202, 204 or 206, respectively, may be incremented by one.

In this particular example, zero is entered in location 202. This signifies that there has not yet been a 4 kbyte piece of data used. However, there have been 20 8 kbyte pieces of data used and 60 16 kbyte pieces of data used. If the maximum size threshold is 59, then when one of the counters is greater than 59, as for example in the counter associated with location 206 of FIG. 2a, a signal may be sent to the operating system. The operating system may, in response to the signal, reconfigure the buffers to increase their size to 16 kbytes if they were less than 16 kbytes.

Figure 2B:
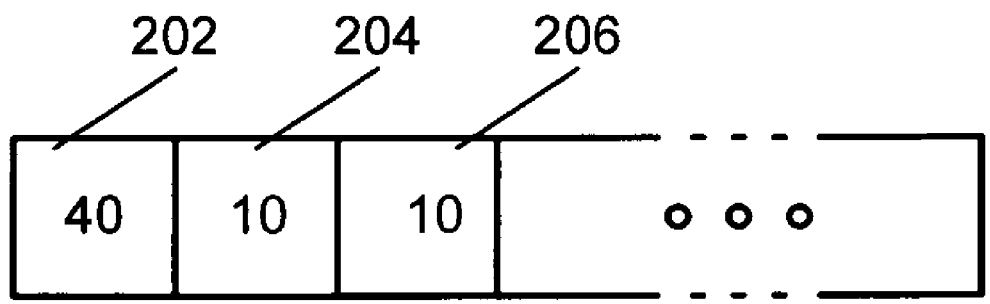

Location 202 of the array in FIG. 2b has an entry of 40 therein. Hence, there have been 40 4 kbytes pieces of data used. According to the invention, if the minimum size threshold is 39, a signal may be sent to the operating system when the counter reaches "40" (see counter 202). As before, the operating system may use this signal to reduce the size of the available buffers or to provide a hint to the application program to use data that is larger than 4 kbytes.

In another embodiment of the invention, the size of the buffers may be increased if data being used is larger than the allocated buffer size and the sum of the entries of all the counters in the array is greater than the maximum size threshold. For example, the sum of the counters in FIG. 2a is 80, which is greater than the maximum size threshold number of 59. Thus, if the size of the current buffers is 4 kbytes and a 16 kbyte-piece of data is used, then a signal may be sent to the operating system. Again, the operating system may use the signal to increase the size of the buffers, to provide a hint to the application program to use data of a smaller size or to increase the number of times data is used within a time period while reducing the data size.

Further, if the current size of the buffers is 16 kbytes and data of 4 kbytes is being used, then if the sum of all the counters in the array is greater than the minimum size threshold, the size of the buffers may be reduced to the requested buffer size. As an example, suppose the minimum size threshold number is 50 and the sum of all counters in the array is 60 (see FIG. 2b) then if a 4 kbyte piece of data is used when the buffers are 16 kbytes in size, then a signal may be sent to the operating system. As discussed above, the operating system may, upon receiving this signal, decrease the size of the buffers or provide a hint to the application program to increase the size of the data being requested.

Figure 3A:
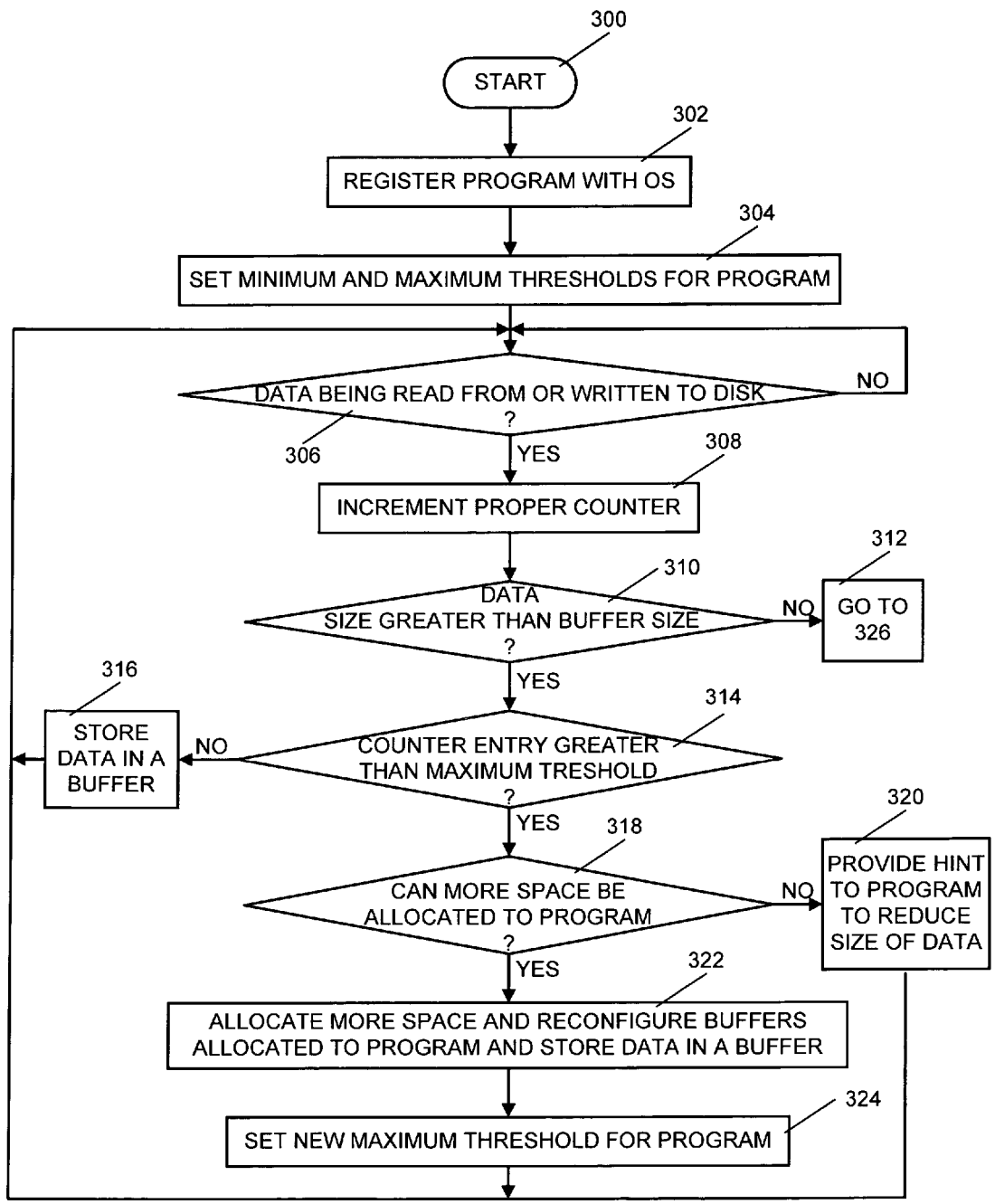
FIG. 3 is a flowchart of a first process that may be used by the invention.
Figure 3B:
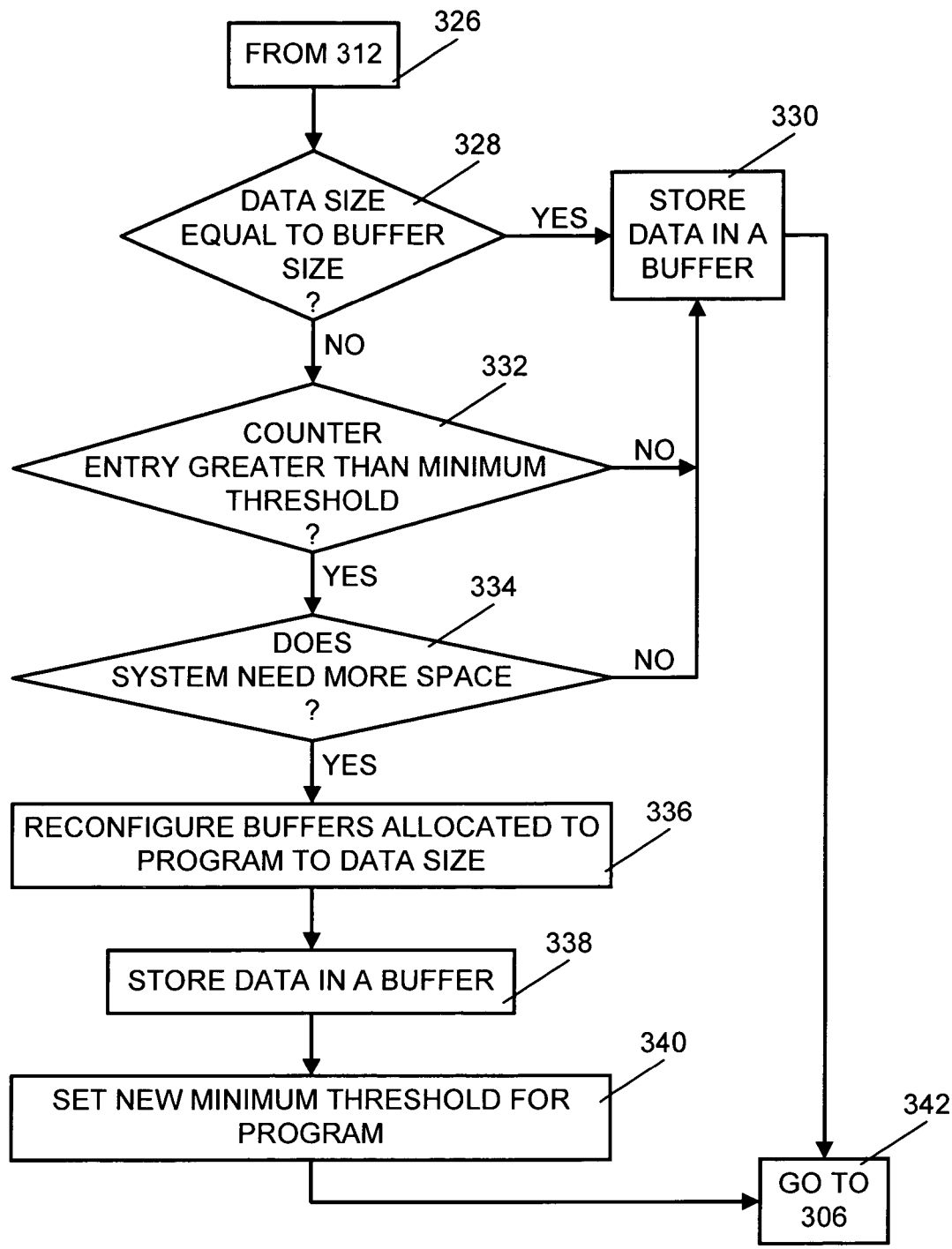

FIG. 3 is a flowchart of a first process that may be used by the invention. The process starts when an application program starts to execute (step 300). The program is registered with the OS and maximum and minimum size thresholds are set for the program (steps 302 and 304). A check is then made to determine whether data is being used. If so, the proper counter is incremented. To figure out which counter to increment, the size of the data being used is taken into consideration. That is, if a 4 kbyte-piece of data is being used, the counter associated with the 4 kbyte-piece of data is incremented (step 308).

A check is then made to determine whether the size of the data is greater than the size of the buffers. If so, another check is made to determine whether the entry in the counter is greater than the maximum size threshold. If the entry in the counter is greater than the maximum size threshold, then another check is made to determine whether more buffer space may be allocated to the program. This depends upon the number of programs being executed on the system as well as other system requirements. In any case, if more space may be allocated to the program, the buffers may be reconfigured to the size of the data, the data then is stored in one of the buffers. Depending upon the implementation of the invention, a new maximum size threshold may or may not be set for the program at that time. The process then jumps back to step 306 (steps 310, 314, 318, 322, 324 and 306).

If no more buffer space may be allocated to the program, the OS may then provide a hint to the program to reduce the size of the data being used and the process then jumps back to step 306 (steps 318, 320 and 306). If the entry in the counter is not greater than the maximum size threshold, the data is stored into one of the buffers and the process returns to step 306 (steps 314, 316 and 306). If the size of the data is not greater than the size of the buffers, the process may jump to step 326 (steps 310, 312 and 326).

When the process jumps to step 326, a check is made to determine whether the size of the data is equal to the size of the buffers. If so, the data is stored into one of the buffers and the process jumps back to step 306 (steps 328, 330 and 306). If the data size is not equal to the size of the buffers it is smaller than the buffers. At that point, a check is made to determine whether the entry in the counter is greater than the minimum size threshold. If so, a check is made to determine whether the system is in need of more memory space. If the system is in need of more memory space, the buffers are reconfigured to the data size, the data is stored in one of the buffers, a new minimum size threshold is set before the process jumps back to step 306 (steps 332, 334, 336, 338, 340 and 342). Note that depending on implementation, the invention may reconfigure the buffers to the smaller size of the data whether or not more memory space is needed.

If the system is not in need of more memory space or if the entry in the counter is not greater than the minimum size threshold, the data is stored into one of the buffers before the process jumps back to step 306 (steps 334, 330 and 342 or steps 332, 330 and 342, respectively). This process will be repeated for each application program running on the system and ends when the system is turned off or is reset.

Figure 4A:
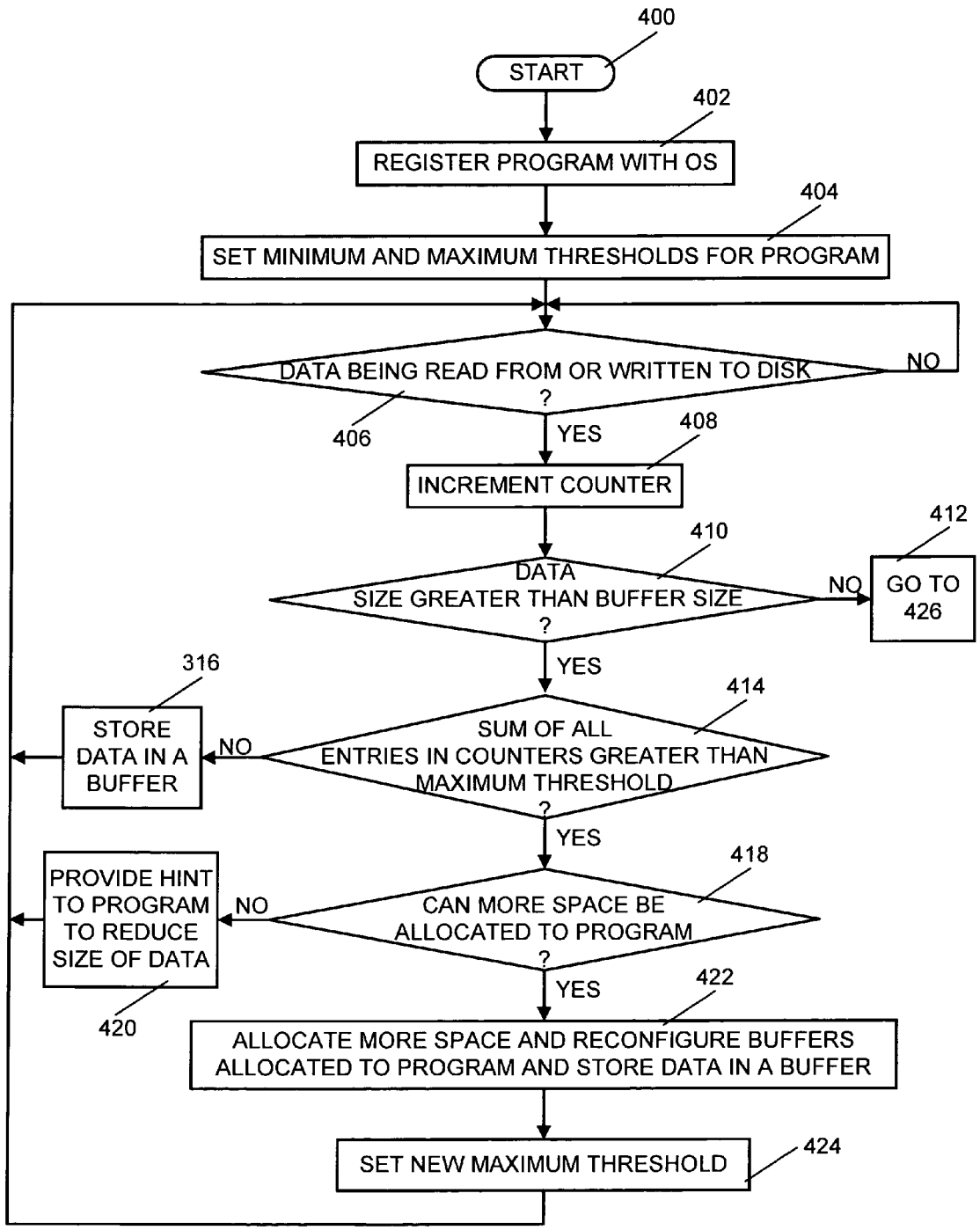
FIG. 4 is a flowchart of a second process that may be used by the invention.
Figure 4B:
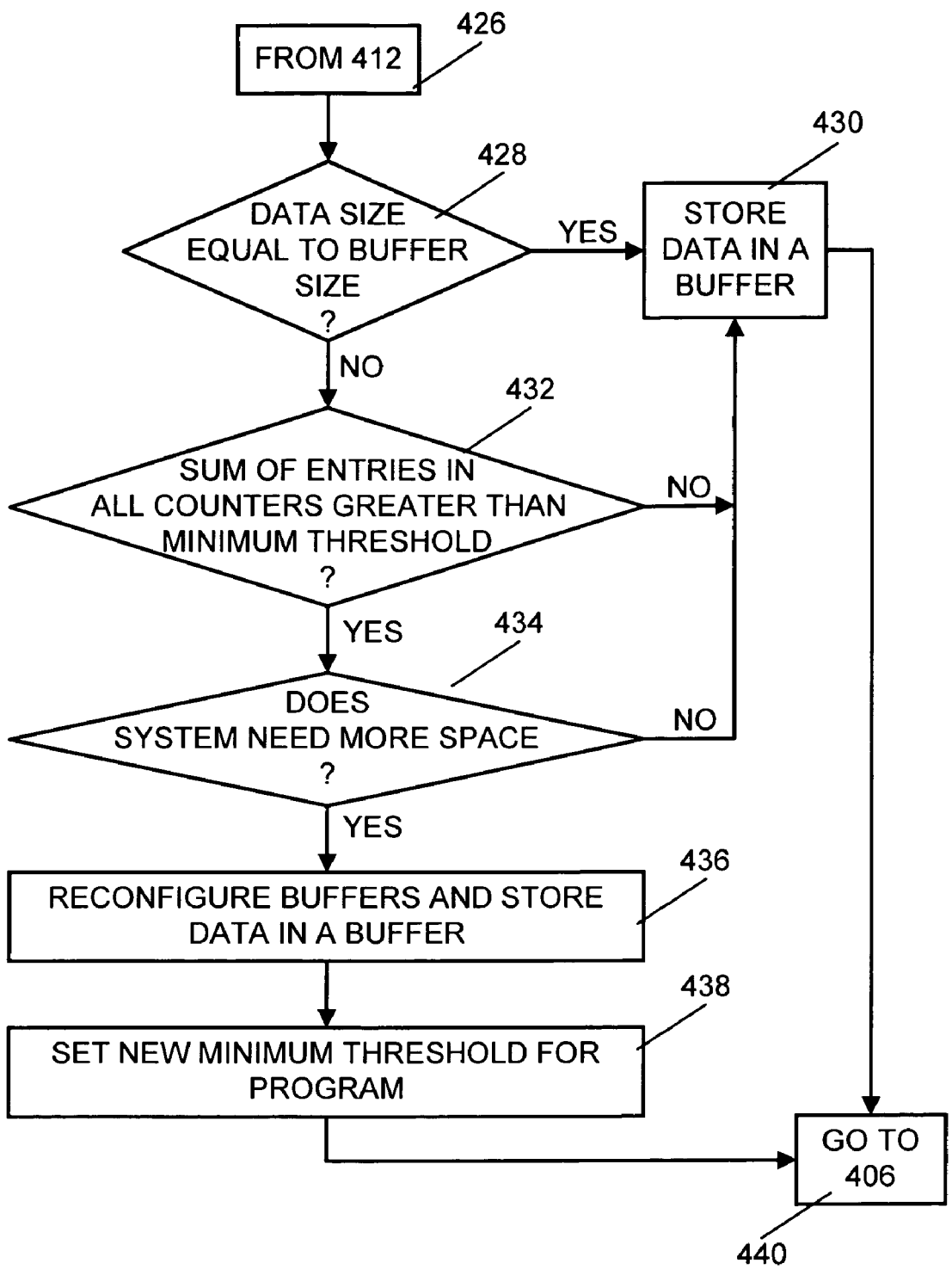

FIG. 4 is a flowchart of a second process that may be used by the invention. This process is identical to the first process (i.e. FIG. 3) except that the checks made in steps 414 and 432 take into consideration the sum of the entries in all the counters when comparing counter entry to max or min threshold while steps 314 and 332 of FIG. 3 only use entries in one counter, the proper counter.

Note that in the example used to explain the invention, the maximum and minimum size thresholds are readjusted or reset each time they have been exceeded within a time frame. However, in certain other embodiments of the invention they need not be reset. Hence, it should be understood that resetting the thresholds is used for illustrative purposes only.

Figure 5:
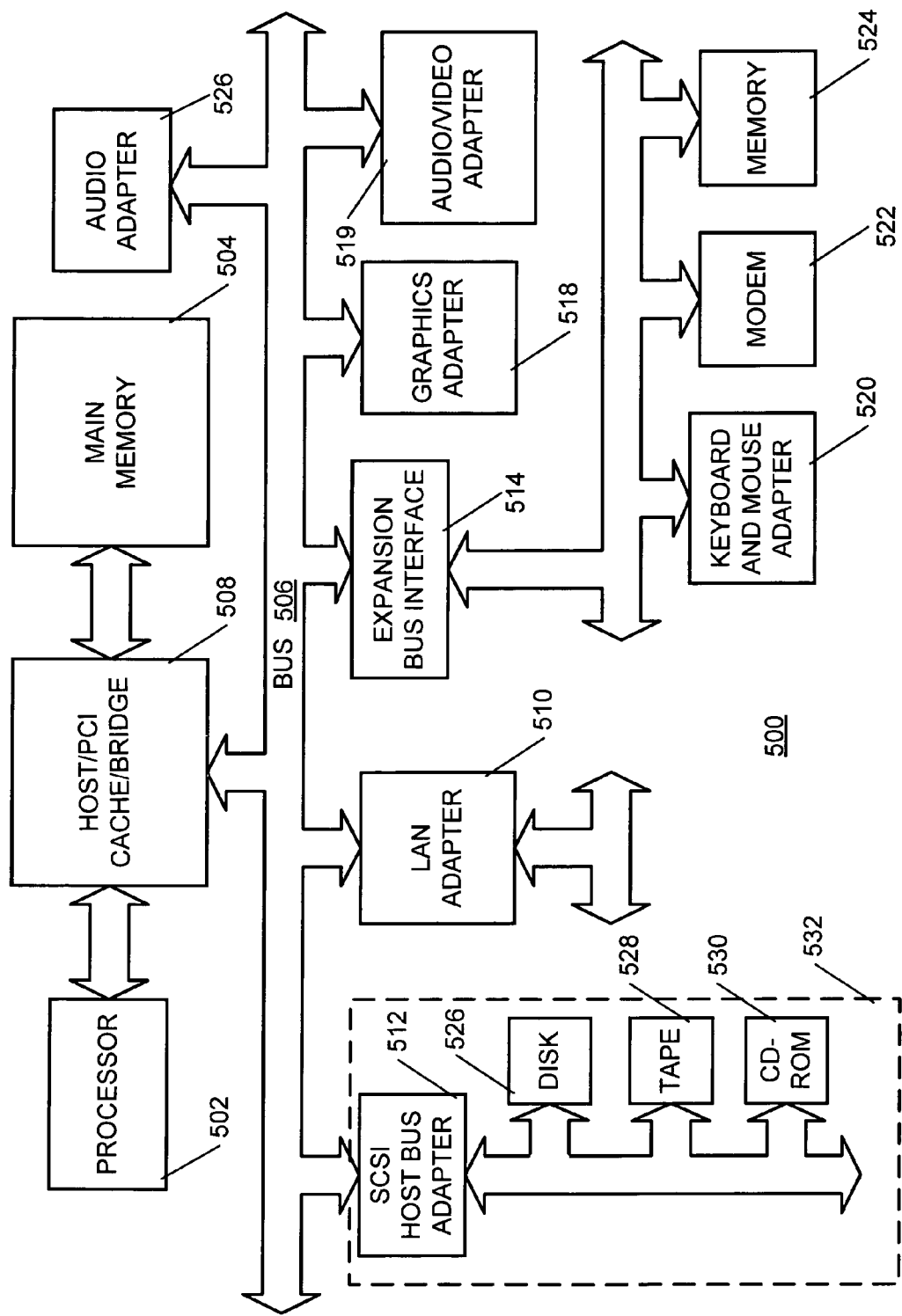
FIG. 5 is an exemplary block diagram of a computer system according to the present invention.

FIG. 5 is a block diagram illustrating a data processing system in which the present invention may be implemented. Data processing system 500 is an example of a client computer. Data processing system 500 employs a peripheral component interconnect (PCI) local bus architecture. Although the depicted example employs a PCI bus, other bus architectures such as Accelerated Graphics Port (AGP) and Industry Standard Architecture (ISA) may be used. Processor 502 and main memory 504 are connected to PCI local bus 506 through PCI bridge 508. PCI bridge 508 also may include an integrated memory controller and cache memory for processor 502. Additional connections to PCI local bus 506 may be made through direct component interconnection or through add-in boards. In the depicted example, local area network (LAN) adapter 510, SCSI host bus adapter 512, and expansion bus interface 514 are connected to PCI local bus 506 by direct component connection. In contrast, audio adapter 516, graphics adapter 518, and audio/video adapter 519 are connected to PCI local bus 506 by add-in boards inserted into expansion slots. Expansion bus interface 514 provides a connection for a keyboard and mouse adapter 520, modem 522, and additional memory 524. Small computer system interface (SCSI) host bus adapter 512 provides a connection for hard disk drive 526, tape drive 528, and DVD/CD-ROM drive 530. Typical PCI local bus implementations will support three or four PCI expansion slots or add-in connectors.

An operating system runs on processor 502 and is used to coordinate and provide control of various components within data processing system 500 in FIG. 5. The operating system may be a commercially available operating system, such as Windows XP, which is available from Microsoft Corporation or AIX, which is an IBM product. An object oriented programming system such as Java may run in conjunction with the operating system and provide calls to the operating system from Java programs or applications executing on data processing system 500. "Java" is a trademark of Sun Microsystems, Inc. Instructions for the operating system, the object-oriented operating system, and applications or programs as well as the invention are located on storage devices, such as hard disk drive 526, and may be loaded into main memory 504 for execution by processor 502.

Those of ordinary skill in the art will appreciate that the hardware in FIG. 5 may vary depending on the implementation. Other internal hardware or peripheral devices, such as flash ROM (or equivalent nonvolatile memory) or optical disk drives and the like, may be used in addition to or in place of the hardware depicted in FIG. 5. Also, the processes of the present invention may be applied to a multiprocessor data processing system.

The description of the present invention has been presented for purposes of illustration and description, and is not intended to be exhaustive or limited to the invention in the form disclosed. Many modifications and variations will be apparent to those of ordinary skill in the art. For example, just one or a multiplicity of threshold numbers may be used. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of adaptively reconfiguring a pool of buffers, the buffers having a current size, the method comprising the steps of:

receiving data of a particular size to be stored in one of the buffers;

counting each time data of the particular size is received to be stored in one of the buffers;

determining whether the particular size of the data is greater than the current size of the buffers; and reconfiguring the current size of the buffers to the particular size of the data if the parucular size of the data is greater than the current size of the buffers and if the number of times data of the particular size is stored in one of the buffers is greater than a first threshold.

2. The method of claim 1 wherein the reconfiguring step includes the step of determining whether more memory space may be allocated before reconfiguring the buffers to the particular size or the data.

3. The method of claim 2 wherein the data being received is being read from or written to a storage device by an application program and if more memory space may not be allocated, a signal is sent to the application program to reduce the size of the data being read from or written to the storage device.

4. The method of claim 1 wherein the current size of the buffers is reconfigured to the particular size of the data if the particular size of the data is smaller than the current size of the buffers and if the number of times data of the particular size is stored in one of the buffers is smaller than a second threshold.

5. The method of claim 4 wherein before the buffers are reconfigured to the particular size of the data it is determined whether memory space is needed for other purposes.

6. The method of claim 5 wherein the data being received is being read from or written to a storage device by an application program and if memory space is not needed, a signal is sent to the application program to increase the size of the data being read from or written to the storage device.

7. The method of claim 6 wherein the first and second thresholds are reconfigured based on system requirements.

8. The method of claim 7 wherein the buffers are reconfigured if the sum of all requests for all buffer sizes is smaller than the second threshold.

9. The method of claim 1 wherein the buffers are reconfigured if the sum of all requests for all buffer sizes is greater than the first threshold.

10. A computer program product on a computer readable medium for adaptively reconfiguring a pool of buffers, the buffers having a current size, the computer program product comprising:
   code means for receiving data of a particular size to be stored in one of the buffers;
   code means for counting each time data of the particular size is received to be stored in one of the buffers;
   code means for determining whether the particular size of the data is greater than the current size of the buffers; and
   code means for reconfiguring the current size of the buffers to the particuiar size of the data if the particuiar size of the data is greater than the current size of the buffers and if the number of times data of the particuiar size is stored in one of the buffers is greater than a first threshold.

11. The computer program product of claim 10 wherein the reconfiguring code means includes code means for determining whether more memory space may be allocated before reconfiguring the buffers to the particular size of the data.

12. The computer program product of claim 11 wherein the data being received is being read from or written to a storage device by an application program and if more memory space may not be allocated, a signal is sent to the application program to reduce the size of the data being read from or written to the storage device.

13. The computer program product of claim 10 wherein the current size of the buffers is reconfigured to the particular size of the data if the particular size of the data is smaller than the current size of the buffers and if the number of times data of the particular size is stored in one of the buffers is smaller than a second threshold.

14. The computer program product of claim 13 wherein before the buffers are reconfigured to the particular size of the data it is determined whether memory space is needed for other purposes.

15. The computer program product of claim 14 wherein the data being received is being read from or written to a storage device by an application program and if memory space is not needed, a signal is sent to the application program to increase the size of the data being read from or written to the storage device.

16. The computer program product of claim 15 wherein the first and second thresholds are reconfigured based on system requirements.

17. The computer program product of claim 16 wherein the buffers are reconfigured if the sum of all requests for all buffer sizes is smaller than the second threshold.

18. The computer program product of claim 10 wherein the buffers are reconfigured if the sum of all requests for all buffer sizes is greater than the first threshold.

19. A system for adaptively reconfiguring a pool of buffers, the buffers having a current size, the system comprising:
   at least one storage system for storing code data; and
   at least one processor for processing the code data to receive data of a particular size to be stored in one of the buffers, to count each time data of the particular size is received to be stored in one of the buffers, to determine whether the particular size of the data is greater than the current size of the buffers, and to reconfigure the current size of the buffers to the particular size of the data if the particular size of the data is greater than the current size of the buffers and if the number of times data of the particular size is stored in one of the buffers is greater than a first threshold.

20. The system of claim 19 wherein the code data is further processed to determine whether more memory space may be allocated before reconfiguring the buffers to the particular size of the data.

21. The system of claim 20 wherein the data being received is being read from or written to a storage device by an application program and if more memory space may not be allocated, a signal is sent to the application program to reduce the size of the data being read from or written to the storage device.

22. The system of claim 19 wherein the current size of the buffers is reconfigured to the particular size of the data if the particular size of the data is smaller than the current size of the buffers and if the number or times data of the particular size is stored in one of the buffers is smaller than a second threshold.

23. The system of claim 22 wherein before the buffers are reconfigured to the particular size of the data it is determined whether memory space is needed for other purposes.

24. The system of claim 23 wherein the data being received is being read from or written to a storage device by an application program and if memory space is not needed, a signal is sent to the application program to increase the size of the data being read from or written to the storage device.

25. The system of claim 24 wherein the first and second thresholds are reconfigured based on system requirements.

26. The system of claim 25 wherein the buffers are reconfigured if the sum of all requests for all buffer sizes is smaller than the second threshold.

27. The system of claim 19 wherein the buffers are reconfigured if the sum of all requests for all buffer sizes is greater than the first threshold.

* * * * *